(12) United States Patent
Beekman et al.

(10) Patent No.: US 10,602,876 B2
(45) Date of Patent: Mar. 31, 2020

(54) LIQUID HEATING DEVICE

(71) Applicant: KONINKLIJKE PHILIPS N.V., Eindhoven (NL)

(72) Inventors: Jarno Beekman, Eindhoven (NL); Fred Fraij, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 461 days.

(21) Appl. No.: 15/030,157

(22) PCT Filed: Oct. 20, 2014

(86) PCT No.: PCT/EP2014/072383
§ 371 (c)(1),
(2) Date: Apr. 18, 2016

(87) PCT Pub. No.: WO2015/062882
PCT Pub. Date: May 7, 2015

(65) Prior Publication Data
US 2016/0235246 A1 Aug. 18, 2016

(30) Foreign Application Priority Data

Nov. 1, 2013 (EP) ..................................... 13191241

(51) Int. Cl.
*A47J 31/56* (2006.01)
*A47J 31/54* (2006.01)
(Continued)

(52) U.S. Cl.
CPC ............ *A47J 31/56* (2013.01); *A47J 31/4403* (2013.01); *A47J 31/542* (2013.01); *F24H 1/08* (2013.01)

(58) Field of Classification Search
CPC ........ A47J 31/54; A47J 31/542; A47J 31/545; A47J 31/56; F24H 1/08
(Continued)

(56) References Cited

U.S. PATENT DOCUMENTS 4,151,790 A * 5/1979 Spirk ....................... A47J 31/56
219/202
5,067,170 A * 11/1991 Nagashima ........... F24H 9/2021
392/339
(Continued)

FOREIGN PATENT DOCUMENTS

CN 101743438 A 6/2010
CN 202457932 U 10/2012
(Continued)

OTHER PUBLICATIONS

English Translation and Office Action issued in connection with corresponding JP application No. 2016-523229 dated Sep. 2, 2016, 4 pages.
(Continued)

*Primary Examiner* — Ibrahime A Abraham
*Assistant Examiner* — John J Norton
(74) *Attorney, Agent, or Firm* — Schott, P.C.

(57) ABSTRACT

The present invention relates to a liquid heating device (10) for a hot beverage machine, comprising: —a flow through heater (18, 18'); —a first tank (12) for receiving liquid (24) to be heated; —a second tank (14) for temporarily storing pre-heated liquid (24'); —a liquid outlet (22) for releasing heated liquid; and —a switching unit (20, 20', 20", 20''') which is configured to switch a liquid-flow cycle of the liquid heating device (10) between a pre-heating cycle, in which liquid (24) flows from the first tank (12) through the flow through heater (18, 18') and into the second tank (14) in order to temporarily store pre-heated liquid (24') in the
(Continued)

second tank (14), and a end-heating cycle, in which the pre-heated liquid (24') flows from the second tank (14) through the flow through heater (18, 18') to the liquid outlet (22).

14 Claims, 5 Drawing Sheets (51) Int. Cl.
    *A47J 31/44*         (2006.01)
    *F24H 1/08*         (2006.01)

(58) Field of Classification Search
    USPC ....... 392/441, 442, 449, 450, 451, 465, 479, 392/480, 485, 488, 489
    See application file for complete search history.

(56) References Cited

U.S. PATENT DOCUMENTS

| | | | | |
|---|---|---|---|---|
| 5,613,422 | A * | 3/1997 | Giuliano | A47J 31/36 99/281 |
| 6,019,028 | A * | 2/2000 | Schmed | A47J 31/0573 99/290 |
| 6,224,755 | B1 * | 5/2001 | Schamberg | A47J 31/002 210/149 |
| 2002/0141742 | A1 | 10/2002 | Beaulieu | |
| 2008/0273868 | A1 * | 11/2008 | Boussemart | F24H 9/2028 392/479 |
| 2010/0112152 | A1 * | 5/2010 | Sinnema | A47J 31/404 426/248 |
| 2010/0195991 | A1 * | 8/2010 | Deivasigamani | F24D 17/0026 392/308 |
| 2011/0305444 | A1 * | 12/2011 | Pussell | F24D 17/0031 392/308 |
| 2013/0206744 | A1 | 8/2013 | King | |

FOREIGN PATENT DOCUMENTS

| | | |
|---|---|---|
| CN | 202636629 U | 1/2013 |
| CN | 202751210 U | 2/2013 |
| CN | 103110356 A | 5/2013 |
| EP | 0380947 A1 | 8/1990 |
| EP | 1097663 A1 | 5/2001 |
| EP | 2481329 A1 | 8/2012 |
| JP | 2003-512878 A | 4/2003 |
| WO | 2010124942 A2 | 11/2010 |

OTHER PUBLICATIONS

English Translation and Notice of Allowance issued in connection with corresponding JP application No. 2016-523229 dated Dec. 8, 2016, 5 pages.

English Translation and Notice of Allowance issued in connection with corresponding RU application No. 2016121461 dated Jun. 18, 2018, 22 pages.

English Translation and Office Action issued in connection with corresponding CN application No. 201480059983.4 dated Jul. 3, 2018, 8 pages.

\* cited by examiner

LIQUID HEATING DEVICE

This application is the U.S. National Phase application under 35 U.S.C. § 371 of International Application No. PCT/EP2014/072383, filed on Oct. 20, 2014, which claims the benefit of International Application No. 13191241.2 filed on Nov. 1, 2013. These applications are hereby incorporated by reference herein.

FIELD OF THE INVENTION

The present invention relates to a liquid heating device for a hot beverage machine, such as e.g. a coffee and/or espresso coffee machine. The present invention further relates to a hot beverage machine comprising such a liquid heating device, in particular to a coffee and/or espresso coffee machine. Preferably, the presented liquid heating device may be applied in single-serve automatic, semi-automatic or manual coffee and/or espresso coffee machines. The presented liquid heating device is, however, not limited to the use in such an appliance.

BACKGROUND OF THE INVENTION

One of the main challenges in hot beverage machines, such a single-serve coffee machines and espresso coffee machines, is to provide hot water in an energy-efficient manner at sufficiently high flow rates. For brewing coffee or espresso coffee a brewing temperature of around 90-95° C. is needed. Given the fact that tap water is usually used as inlet liquid, this means that such a liquid heating device in a coffee or espresso machine usually has to heat up water from an inlet temperature of around 15-20° C. up to an outlet temperature of around 90-95° C.

Two different types of liquid heating system for such hot beverage machines are generally known. A first machine type heats up the water by means of a water boiler. The second machine type uses one or more flow-through heaters or thermoblocks. Machines using water boilers are most suitable for high flow rates at low pressures, which is especially suitable for the production of a "regular" coffee drink typically having a volume of around 120 ml. Machines using flow-through heaters are on the other hand most suitable for lower flow rates at high pressures, which is particularly suitable for the production of an espresso coffee having a typical volume of around 40-60 ml.

It becomes especially challenging if one and the same liquid heating device shall be used for a combined machine that allows to produce "regular" coffee drinks as well as espresso coffees. For "regular" coffee drinks the water should be provided at high flow rates and at low pressures, while a comparatively low flow rate and high pressures are needed in order to produce a crema which is highly appreciated for espresso coffee drinks. Therefore, neither the state of the art boiler nor the state of the art flow-through heating techniques seem to be suitable for such a combined coffee and espresso machine.

A further difference of the two types of state of the art liquid heating techniques is their different level of power consumption. While boiler heating systems usually have power levels ranging around 1,450 W, modern thermoblocks would, due to their inherent flow rate limitation, have to be operated at around 2,100 W in order to produce the needed flow rates of around 5-6 ml/s, in particular of 5.6 ml/s. Even though thermoblocks are generally preferable due to their capability to cope with higher water pressures, the above-mentioned high power levels make the thermoblocks not suitable to be used in low voltage countries, such as Brazil and the USA.

On the other hand, simply using a high pressure boiler system is also not recommended for mass-produced products, because such high pressure boiler systems are quite complicated and expensive to manufacture. Apart from that, there are very high safety requirements that are put on such systems which can more easily be met by using flow through heaters instead of high pressure boiler systems.

EP 2 481 329 A1 discloses an attempt to produce high flow rates with a regular flow-through heater. In order to overcome the inherent flow rate limitation of such a flow-through heater, EP 2 481 329 A1 proposes to pre-heat the water reservoir by means of the flow-through heater in advance, such that the inlet temperature of the water within the reservoir is pre-heated to a temperature of around 40° C. As soon as a coffee drink has to be produced, the water "only" has to be heated starting at 40° C. up to the water dispensing temperature of around 90-95° C. This enables to reduce the time taken to heat up the water to the dispensing temperature on demand. However, constantly heating up the water reservoir to a temperature of 40° C. also seems to be quite energy inefficient, especially if hot water is only needed seldom, e.g. if a coffee machine is only used once or twice per hour. This system is especially inefficient if the user only brews small amounts of coffee, e.g. 1 or 2 cups, while the full capacity of the water container is pre heated Thus, there is still room for improvement.

SUMMARY OF THE INVENTION

It is an object of the present invention to provide an alternative liquid heating device for a hot beverage machine that enables to produce a hot liquid supply at high flow rates and, if needed, also at high pressures, wherein the liquid heating device may be operated at a comparatively low power level.

According to a first aspect of the present invention, this object is solved by a liquid heating device for a hot beverage machine, comprising:
  a flow through heater;
  a first tank for receiving liquid to be heated;
  a second tank for temporarily storing pre-heated liquid;
  a liquid outlet for releasing heated liquid; and
  a switching unit which is configured to switch a liquid flow cycle of the liquid heating device between a pre-heating cycle, in which liquid flows from the first tank through the flow through heater and into the second tank in order to temporarily store pre-heated liquid in the second tank, and a end-heating cycle, in which the pre-heated liquid flows from the second tank through the flow through heater to the liquid outlet.

In a further aspect of the present invention, a hot beverage machine is presented that comprises a liquid heating device of the above-mentioned type.

Preferred embodiments of the invention are defined in the dependent claims. It shall be understood that the claimed hot beverage machine has similar and/or identical preferred embodiments as the claimed liquid heating device and as defined in the dependent claims.

As explained above, the flow rate of a flow-through heater mainly depends on the liquid temperature increase that has to be achieved and the power level at which the flow-through heater is operated. The idea of the present invention is to use two separate heating cycles, a first heating cycle to pre-heat liquid (denoted as pre-heating cycle), and a second cycle in which the pre-heated liquid is finally heated to the desired end temperature (denoted as end-heating cycle).

In contrast to the system proposed in EP 2 481 329 A1 this is not done by pre-heating the whole liquid tank, which is rather energy inefficient, but by pre-heating only a part of the liquid from the main reservoir (denoted as first tank) and temporally storing it in a second reservoir (denoted as second tank). The presented liquid heating device thereto comprises a switching unit which enables to switch the flow streams within the liquid heating device between the two different heating cycles.

In the pre-heating cycle parts of the liquid stored in the first tank is drawn out, preferably by means of a pump, and pumped through the flow-through heater into the second tank which serves as a temporary storage. In this pre-heating cycle the part of the liquid that is drawn out of the first tank is pre-heated, preferably to a temperature of around 35-40° C., and afterwards temporarily stored in the second tank. In the end-heating cycle the pre-heated liquid may then be drawn out of the second tank in order to finally heat it up to the desired end temperature by means of the flow-through heater, wherein it is finally delivered to the liquid outlet. This liquid outlet may be fluidly connected to the brewing chamber of a coffee and/or espresso coffee machine in which the coffee and/or espresso coffee is finally brewed.

The liquid heating device according to the present invention thus makes use of a two-step liquid heating system. This has the following significant advantage:

Pre-heating the water to about 35-40° C. may be done in the first heating step (within pre-heating cycle) at a fairly high flow rate with low power consumption. If the liquid is then heated up to its end temperature (around 90-95° C.) in the second heating step heating (within end-heating cycle), the desired flow rate of around 5-6 ml/s consumes a lot less power compared to situations in which the liquid is heated up in a single heating cycle from 15-20° C. directly to 90-95° C. This allows to use flow-through heaters that operate at lower power levels, preferably at around 1,400 W.

In contrast to the flow-through heating apparatus according to EP 2 481 329 A1, which so to say also makes use of a two-step heating approach, not the whole main reservoir (herein denoted as first tank) is constantly pre-heated, but only a smaller amount of liquid is pre-heated and temporally stored in a second, separate tank. In practice it would be meaningful to only pre-heat a typical volume of liquid that is sufficient for one cup of hot beverage, e.g. 40 ml for an espresso coffee or 120 ml for a "regular" coffee. The rest of the liquid may remain unheated in the first tank.

Before starting the liquid heating device, the whole amount of liquid to be heated is received within the first tank and the second tank is empty. Whereas it is generally conceivable to pre-store a certain amount of pre-heated liquid, e.g. enough for a cup of coffee or tea, per default in the second tank (independent on a user demanding a hot beverage), it is according to the present invention preferred that the first heating cycle (pre-heating cycle) is dependent on the user's demand, i.e. initiated as soon as the user selects a certain type of hot beverage.

According to an embodiment of the present invention, the switching unit comprises a controller that is configured to switch between the pre-heating cycle and the end-heating cycle depending on a predefined amount of liquid that is released from the first tank.

This means that the controller switches from the pre-heating cycle to the end-heating cycle as soon as the amount of liquid that has been released from the first tank reaches the amount of liquid that is needed for the hot beverage selected by the user. In other words, only the amount of liquid that is needed for the selected hot beverage is pre-heated, whereas the rest of the liquid may remain unheated in the first tank. In this way, no extra energy is consumed for heating up liquid amounts that in the current situation do not have to be heated. Hence, the second tank is according to this embodiment only filled up upon request and emptied again as soon as enough liquid has been pre-heated for the selected hot beverage.

As explained above, the controller of the switching unit switches from the pre-heating cycle to the end-heating cycle as soon as the amount of liquid released from the first tank reaches a certain threshold (denoted as predefined amount of liquid). This amount of liquid released from the first tank may be measured in several ways.

According to one embodiment, the liquid heating device further comprises a flow meter for measuring a liquid flow rate that is released from the first tank and for calculating a total amount of released liquid therefrom, wherein the controller is configured to switch between the pre-heating cycle and the end-heating cycle when the calculated total amount of released liquid reaches the predefined amount of liquid.

According to an alternative embodiment, the liquid heating device may comprise a fluid level sensor for measuring a fluid level within the second tank, wherein the controller is configured to switch between the pre-heating cycle and the end-heating cycle when the fluid level within the second tank reaches the predefined amount of liquid.

According to the first mentioned alternative, the amount of liquid released from the first tank is calculated by integrating the measured liquid flow rate over time. This may be done in a very accurate manner. In the second mentioned alternative the amount of liquid released from the first tank is measured only indirectly by checking the amount of liquid that reaches the second tank. The second alternative has the advantage that the fluid level within the second tank may be measured in a fairly easy manner by means of e.g. an electrical or mechanical sensor.

It shall be noted that both alternatives may also be combined, i.e. having a flow meter for measuring the liquid flow rate withdrawn from the first tank as well as a fluid level sensor for measuring the fluid level within the second tank. In this case the values measured by the flow meter could even be compared to the values measured by the flow level sensor, so that it could be monitored whether there is a difference of the amount of liquid that leaves the first tank and the amount of liquid that reaches the second tank after the pre-heating cycle. This could help to detect any leakages within the system.

Nevertheless, according to both above-mentioned embodiments, the calculated amount of liquid released from the first tank and/or the fluid level within the second tank may be used for triggering the controller to switch from the pre-heating cycle to the end-heating cycle as soon as enough liquid has been pre-heated.

According to a further embodiment, the liquid heating device may comprise a data interface for receiving the predefined amount of liquid, which predefined amount of liquid is the amount of liquid necessary for a hot beverage selected by a user, wherein said data interface is connected to the controller.

If a user selects a certain type of hot beverage, the data interface may thus receive the amount of liquid that is necessary for the selected hot beverage and may transfer this information to the controller which then initiates the pre-heating cycle by switching the switching unit into the first position, and switching the switching unit into the second position as soon as the predefined amount of liquid necessary for the selected hot beverage has been released from the first tank, pre-heated and transferred into the second tank, so that the pre-heated liquid may then be heated in the second heating cycle to the desired end temperature.

The amount of liquid necessary for the selected hot beverage may be determined in different ways. The hot beverage machine may either comprise several buttons, wherein each button allows selecting a different kind of recipe, e.g. the first button may be used for "regular" coffee and the second button may be used for espresso coffee. In this case the recipe itself (i.e. how much liquid is needed for a "regular" coffee or an espresso coffee) may be stored in the system in a small storage unit. In case the user e.g. selects an espresso coffee, the controller may thus receive the information that for an espresso coffee 40 ml are needed, so that the controller then controls the switching unit to open up the pre-heating cycle until 40 ml have been pre-heated and transferred to the second tank, and then to switch the switching unit into its second position to open up the second heating cycle in order to heat up the pre-heated 40 ml of liquid to the desired end temperature.

On the other hand, it may also be conceivable that the user may manually determine the desired amount of heated liquid that should be used to produce the selected hot beverage. In this case, the controller would switch the switching unit from the first into the second position as soon as the amount of liquid manually selected by the user has been pre-heated.

Switching between the pre-heating cycle and the end-heating cycle may be done within the switching unit in different technical ways.

According to an embodiment, the switching unit comprises one or more switching valves and a controller that is configured to switch a valve position of the one or more switching valves between a first valve position and a second valve position in order to switch the liquid flow cycle of the liquid heating device between the pre-heating cycle and the end-heating cycle.

In this case the switching unit is connected to the flow-through heater, the first tank, the second tank and the liquid outlet. The one or more switching valves are adapted to connect the flow-through heater selectively with the first tank, the second tank, and/or the liquid outlet. In the pre-heating cycle the flow-through heater is fluidly connected via the switching unit (via the one or more valves of the switching unit) at its inlet side with the first tank and at its outlet side with the second tank. In the end-heating cycle the flow-through heater is fluidly connected via the switching unit (via the one or more valves of the switching unit) at its inlet side with the second tank and with its outlet side with the liquid outlet.

According to a further embodiment, the switching unit comprises only a single switching valve which is connected with a flow-through heater, the first tank, the second tank and the liquid outlet. A single switching valve has the advantage of being less space-consuming than a plurality of valves. Apart from that, processing time may be reduced to control the single switching valve.

It is particularly preferred that said single switching valve is realized as an electrical switching valve which includes the controller. In contrast to mechanical switching valves such electrical switching valves allow changing the valve positions even faster and may easily be calibrated. The controller may in this case by integrated into the electrical valve, so that no separate entity is needed.

According to a further embodiment, the controller is configured to switch the valve position of the one or more switching valves also to a third valve position in which the pre-heated liquid may flow from the second tank through the flow through heater and back into the second tank again.

In this way, pre-heating may take place in several steps by pumping the liquid through the flow-through heater a few times. In practice, this could work as follows: In the first step the controller of the switching unit switches the valve position of the one or more switching valves to the first valve position, wherein liquid is drawn out of the first tank, pre-heated by flowing through the flow-through heater and then temporarily stored in the second tank. After that the controller would then switch the valve position of the one or more switching valves into the third valve position in order to pump the temporarily stored pre-heated liquid from the second tank through the flow-through heater a second time and back into the second tank again. This third heating cycle may be repeated until the liquid has been pre-heated to a desired pre-heating temperature. As soon as this pre-heating temperature has been reached, the controller of the switching unit may then switch the one or more switching valves to their second position in order to withdraw the pre-heated water from the second tank, pump it through the flow-through heater in order to heat it up to the desired final brewing temperature, and then transfer it to the liquid outlet from which it can flow into the brewing chamber. In contrast to the above-mentioned embodiments, the liquid does in this case run through the pre-heating cycle not only once but several times before the pre-heated liquid is finally heated up in the second heating cycle to the finally desired end temperature.

If the liquid runs through the pre-heating cycle more than one time, the liquid may be even more pre-heated, e.g. to temperatures above 45° C., before being stored in the second tank. Ideally the temperature increase per cycle (including the en-heating cycle) is minimized to enable the use of a lower power flow through heater. The energy consumption of the system will remain the same, since the same amount of liquid is heated to the same end temperature as in previous embodiment. The power of the termoblock can, however, be decreased, since each heating cycle will require less power to operate.

Instead of using valves as indicated above, the technical principle of the present invention may also be realized if the switching unit comprises at least two pumps that may be selectively controlled.

According to an embodiment, the switching unit comprises:
a first pump that is on its inlet-side fluidly connected to the first tank and on its outlet-side fluidly connected to the flow through heater,
a second pump that is on its inlet-side fluidly connected to the second tank and on its outlet-side fluidly connected to the flow through heater, and
a controller that is configured to selectively turn-on either the first pump or the second pump in order to switch the liquid flow cycle of the liquid heating device between the pre-heating cycle and the end-heating cycle.

In order to initiate the pre-heating cycle, the first pump will be turned on until the predetermined amount of liquid has been withdrawn from the first tank (by means of the first pump), pre-heated within the flow through heater, and transferred to the second tank. Then, the first pump will be turned off and the second pump will be turned on. This initiates the end-heating cycle in which the pre-heated liquid is drawn out of the second tank (by means of the second pump), end-heated within the flow through heater, and finally transferred to the liquid outlet. The switching between the two pumps is controlled by the controller of the switching unit.

According to the latter-mentioned embodiment it is preferred that the outlet-side of the first pump is fluidly connected to a first inlet of the flow through heater, and that the outlet-side of the second pump is fluidly connected to a second inlet of the flow through heater that is different from the first inlet. Thus, the liquid in the pre-heating cycle flows through a first part of the flow through heater, whereas in the end-heating cycle the liquid flows through a second part of the flow through heater that is different from and independent of the first part. The first part of the flow through heater may, for example, comprises a shorter duct than the second part of the flow through heater, such that the liquid is heated to a higher extent within the end-heating cycle than within the pre-heating cycle. However, the first part of the flow through heater could also have a lower temperature than the second part. Still further, it is conceivable that the ducts within the first part of the flow through heater are more insulated from the heating coil within the flow through heater than the ducts within the second part of the flow through heater.

Similar as in the above-mentioned embodiment that makes use of a switching unit with one or more different switching valves, the latter-mentioned embodiment having two pumps also use preferably one and the same flow through heater for the pre-heating cycle as well as for the end-heating cycle. The only difference is that a pre-heating separated in different steps as mentioned above (by means of a third valve position) is not possible with the embodiment using two pumps.

According to a further embodiment, the flow-through heater comprises a thermoblock. Besides the above-mentioned advantage of being able to cope with high water pressures, such thermoblocks are ready for use after a very short heat-up period.

The second tank is according to the present invention preferably chosen to be smaller than the first tank. In order to prevent an overflow of the second tank, e.g. due to a malfunction of the system, it is according to a further embodiment preferred that the second tank comprises an overflow outlet that is fluidly connected to the first tank. A pressure build-up in the second tank or an overflow may thus effectively be prevented. If for any reason too much liquid is preheated and transferred into the second tank, superfluous pre-heated liquid may then flow back via the overflow outlet into the first tank.

According to a still further embodiment, the presented liquid heating device may furthermore comprise a second heating element for pre-heating the liquid within the first tank. In this case the liquid heating device would not only comprise the flow-through heater but also a second heating element which may heat up the liquid within the first tank in a constant manner, in a timely variable manner or upon request. If the liquid is already pre-heated in the first tank, the above-mentioned different heating cycles may be ran through in an even faster manner, so that the overall flow rate that may supplied at the liquid outlet may further be increased.

BRIEF DESCRIPTION OF THE DRAWINGS

These and other aspects of the invention will be apparent from and elucidated with reference to the embodiment(s) described hereinafter. In the following drawings FIG. 1 shows a first embodiment of a liquid heating device according to the present invention;
FIG. 2 shows a second embodiment of the liquid heating device according to the present invention;
FIG. 3 shows a third embodiment of the liquid heating device according to the present invention; and
FIG. 4 shows a fourth embodiment of the liquid heating device according to the present invention.

DETAILED DESCRIPTION OF EMBODIMENTS

FIG. 1 shows a first embodiment of a liquid heating device according to the present invention. The liquid heating device is in its entirety denoted with reference numeral 10. The liquid heating device 10 is preferably used for heating up a liquid in a hot beverage machine, such as a coffee, espresso coffee and/or tea machine. The liquid heating device 10 may be part of such a machine and is preferably integrated into the interior of the machine.

The liquid heating device 10 comprises two separate liquid tanks or reservoirs, a first tank 12 and a second tank 14. Further, the device 10 comprises a pump 16, a flow-through heater 18, a switching unit 20 and a liquid outlet 22.

The first tank 12, the second tank 14, the flow-through heater 18 and the liquid outlet 22 may be selectively connected with each other by means of the switching unit 20. According to the first embodiment, this switching unit 20 comprises a plurality of inlets and a plurality of outlets. In the present case the switching unit 20 comprises three inlets I1-I3 and three outlets O1-O3. The first inlet I1 of the switching unit 20 is fluidly connected to an outlet O12 of the first tank 12. The second inlet I2 of the switching unit 20 is fluidly connected to an outlet O14 of the second tank 14. The third inlet I3 of the switching unit 20 is fluidly connected to an outlet O18 of the flow-through heater 18. The first outlet O1 of the switching unit 20 is fluidly connected via the pump 16 to an inlet I18 of the flow-through heater 18. The second outlet O2 of the switching unit 20 is fluidly connected to an inlet I14 of the second tank 14. The third outlet O3 of the switching unit 20 is fluidly connected to the liquid outlet 22.

The switching unit 20 mainly has the function to selectively connect the first tank 12, the second tank 14 and/or the liquid outlet 22 with the flow-through heater 18. This can be done by selectively connecting the different inlets I1-I3 with the different outlets O1-O3 of the switching unit 20 internally with each other. This allows to establish different liquid flow or heating cycles within the system 10.

Figure 1A:
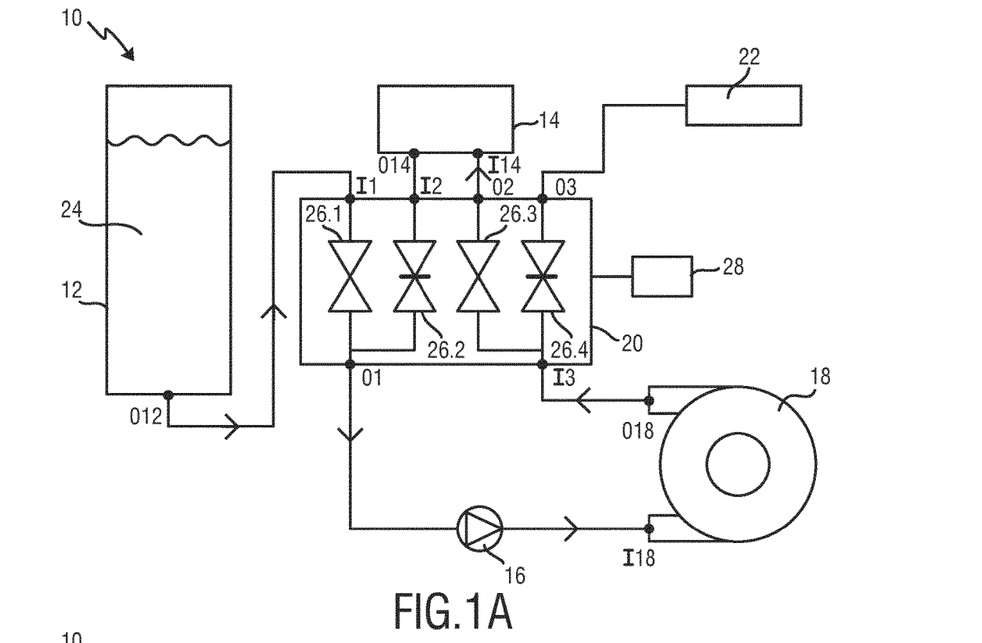
Figure 1B:
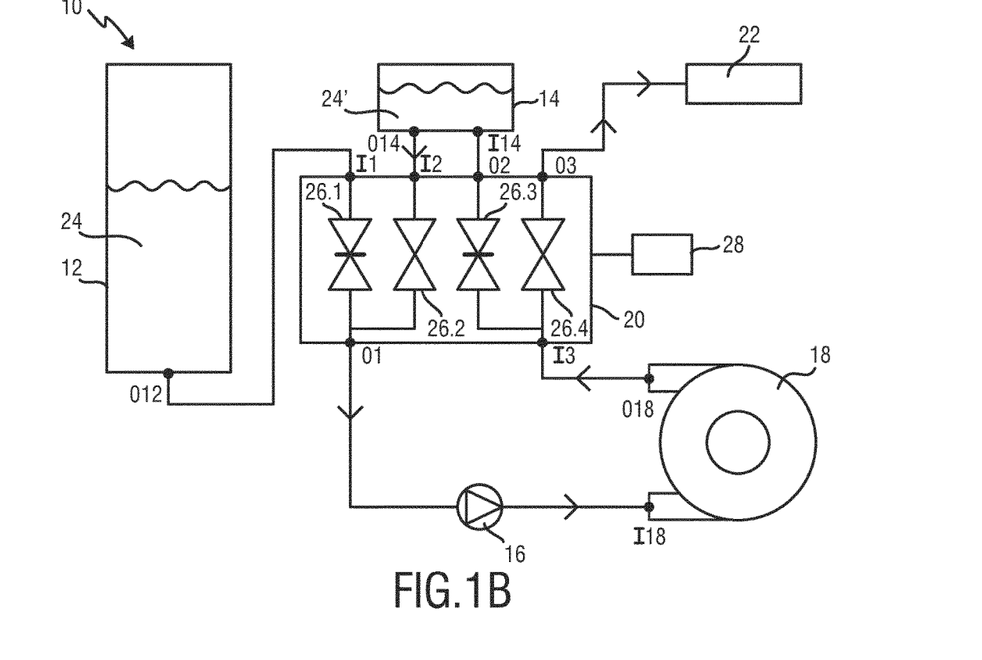

According to the present invention the liquid to be heated 24 is preferably heated up in two separate cycles. In a first cycle, which is schematically illustrated in FIG. 1A, the liquid 24 is pre-heated to an intermediate temperature, preferably of around 35-40° C. This first cycle is in the following also denoted as pre-heating cycle. In the second cycle, which is schematically illustrated in FIG. 1B, the pre-heated liquid 24' is heated up to a desired end temperature of around 90-95° C. This second cycle is in the following denoted either as end-heating cycle or brewing cycle.

According to the first embodiment shown in FIG. 1, the switching unit 20 may switch between these two cycles by means of a plurality of valves 26.1-26.4.

When starting the hot beverage machine into which the liquid heating device 10 is integrated, the situation is usually as illustrated in FIG. 1A. The liquid to be heated 24 is received in or filled into the first tank 12. This first tank 12 is the main liquid tank. In coffee, espresso coffee or tea machines water is usually used as liquid 24. The second tank 14 is at this stage empty. The flow-through heater 18 is heated up in order to be ready for use. As soon as all these requirements are fulfilled, the pre-heating cycle shown in FIG. 1A may commence. The pump 16 will then pump a certain amount of liquid 24 out of the first tank 12. The valve 26.1 is thereto in its open position. The withdrawn amount of liquid 24 will flow from the outlet O12 of the first tank 12 to the inlet I1 of the switching unit 20, through the valve 26.1 to the outlet O1 of the switching unit 20, and via the pump 16 to the inlet I18 of the flow-through heater 18. This amount of liquid 24 will then be pre-heated by flowing through the flow-through heater 18. The pre-heated liquid 24' leaves the flow-through heater 18 at outlet O18, flows to the inlet I3 of the switching unit 20 via the valve 26.3 to the outlet O2 of the switching unit 20 and finally reaches the inlet I14 of the second tank 14. The pre-heated liquid 24' is then temporarily stored within the second tank 14. It is to be noted that only a certain amount of liquid 24 is pre-heated and then stored in the second tank 14. This amount of pre-heated liquid 24' is preferably sufficient for one cup of hot liquid that shall be produced by the hot beverage machine. This means e.g. an amount of 40-60 ml for espresso coffee, an amount of 100-140 ml for a "regular" coffee, or an amount of e.g. up to 200 ml for tea. The second tank 14 may thus have a comparatively smaller volume than the first tank 12.

It is generally conceivable to pre-heat a predetermined amount of liquid 24 so to say on stock. Preferably, the above-mentioned pre-heating cycle is, however, initialized by the user when requesting a selected hot beverage. The selection of the user will then initiate the above-mentioned pre-heating cycle. The amount of liquid 24 that is withdrawn from the first tank 12 and pre-heated will then correspond to the amount of liquid that is needed for the selected hot beverage. This means that only the amount of liquid 24 that is needed for producing the selected hot beverage is pre-heated and temporarily stored within the second tank 14.

As soon as enough liquid 24 has been pre-heated, the switching unit 20 may switch into its second position, wherein the pre-heated liquid 24' stored in the second tank 14 is heated up to the desired end temperature. This is done in the brewing cycle that is schematically illustrated in FIG. 1B. In this brewing cycle the pre-heated liquid 24' is pumped out of the second tank 14 again. This is preferably done by the same pump 16 that also pumps the cold liquid 24 out of the first tank 12 within the pre-heating cycle. The pump 16 is therefore preferably arranged between the outlet O1 of the switching unit 20 and the inlet I18 of the flow through heater 18. In the brewing cycle the pre-heated liquid 24' will thus flow as follows (see FIG. 1B): The pre-heated liquid 24' leaves the outlet O14 of the second tank 14, reaches the inlet I2 of the switching unit 20, flows through the valve 26.2 to the outlet O1 of the switching unit 20, and from there via the pump 16 to the inlet I18 of the flow-through heater 18. The pre-heated liquid 24' is then heated up to its end temperature by flowing (the second time) through the flow-through heater 18. After having the desired end temperature the heated liquid will then leave the flow-through heater 18 at the outlet O18, flow through the inlet I3 of the switching unit 20 via the valve 26.4 to the outlet O3 of the switching unit 20 and finally to the liquid outlet 22. In a coffee or an espresso machine this liquid outlet 22 of the liquid heating device 10 may be fluidly connected with a brewing chamber in which the coffee and/or tea is produced.

By comparing the two heating cycles (FIG. 1A vs. FIG. 1B) it may be observed that the valve positions of the valves 26.1-26.4 is different. In other words, the switching unit 20 has to switch the valve positions of the valve 26.1-26.4 from a first position into a second position when changing from the pre-heating cycle to the brewing cycle. In the first position (see FIG. 1A) valves 26.1 and 26.3 are open, while valves 26.2 and 26.4 are closed. In the second position (see FIG. 1B) valves 26.1 and 26.3 are closed, while valves 26.2 and 26.4 are open.

This switching, i.e. the change of the valve positions of valves 26.1-26.4 may be done by a controller 28. This controller 28 may either be a mechanical or an electronic controller. The controller 28 may also be denoted as control unit. According to a preferred embodiment, the controller 28 is realized as a processing unit comprising a chip with logic stored thereon that allows to switch the valve positions of the valves 26.1-26.4. This controller 28 is preferably integrated into the switching unit 20. However, the controller 28 may also be remotely located from the switching unit 20 (as shown in the figures). In the latter-mentioned case it may be connected to the switching unit 20 either via a wireless data connection or via a hardwired data connection.

Furthermore, it shall be noted that the first embodiment shown in FIG. 1 comprises four different valves 26.1-26.4, since this is the simplest case to accomplish the switching between the two heating cycles. However, the same principle may also be realized with less valves if manifold valves are used that allow to selectively divide the flow streams. Still further, it shall be noted that the valves 26.1-26.4 are in FIG. 1 illustrated as two-way valves. It is also conceivable and sufficient if these valves 26.1-26.4 are designed as one-way valves.

The two-step heating principle that is realized with the liquid heating device 10 according to the present invention has the advantage that high liquid flow rates may be achieved with a comparatively low power consumption of the flow-through heater 18, independent if high or low pressures are needed. The flow-through heater 18 is preferably designed as a thermoblock. In order to heat up water from an input temperature of around 15-20° C. in only one heating cycle directly to an end temperature of 90-95° C., such thermoblocks would usually have to be operated at a power level of around 1.900 W if a flow rate typical for such a hot beverage machine of around 5-6 ml/s has to be achieved. If the water is pre-heated in the pre-heating cycle to a temperature of 35-40° C. and then heated up in the brewing cycle to its end temperature of 90-95° C., the same flow rate may even be achieved if the thermoblock is operated at a power level of around 1.400 W. This allows to use the presented liquid heating device 10 also in low voltage countries like Brazil and the USA. A further advantage is that such a kind of liquid heating device 10 may be used in a combined coffee and espresso coffee machine, as it allows to produce hot liquid streams at low pressures (needed for "regular" coffees) as well as at high pressures (needed for espresso coffee).

Figure 2A:
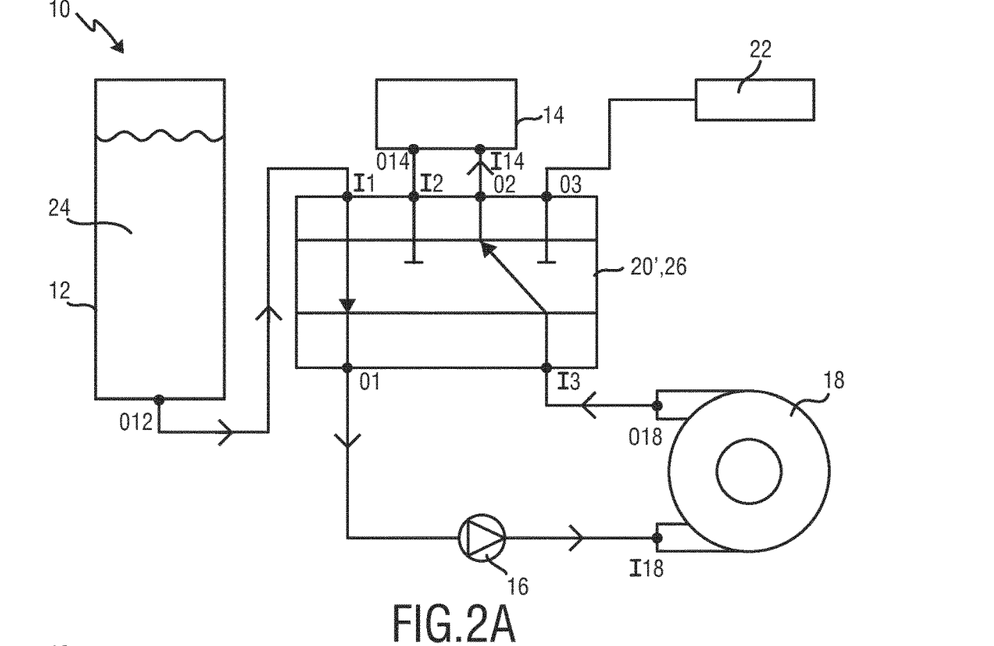
Figure 2B:
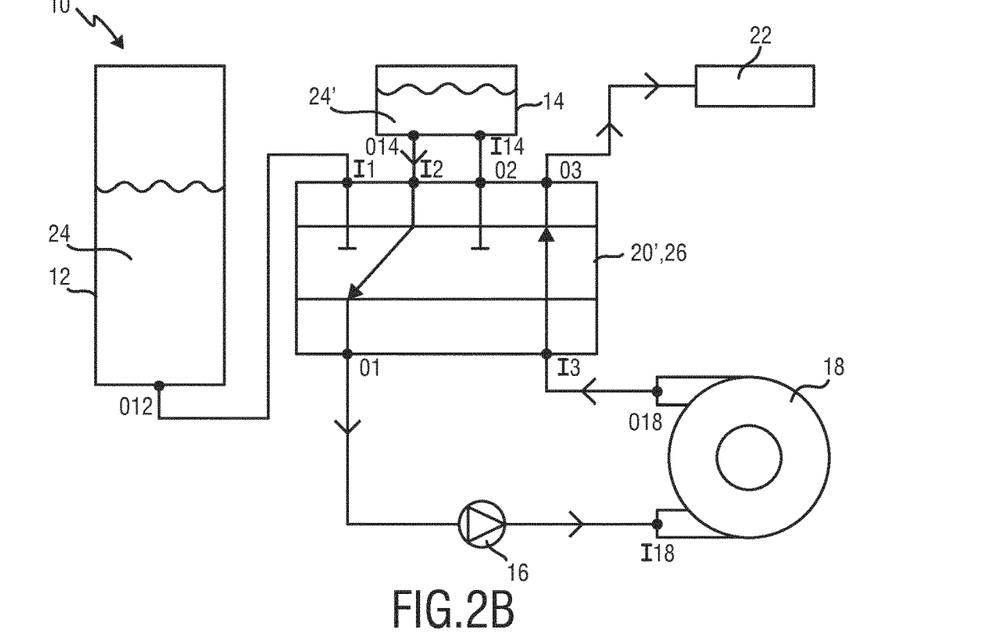

FIG. 2 shows a second embodiment of the liquid heating device 10 according to the present invention. The main difference to the first embodiment shown in FIG. 1 is that, instead of using mechanical switching valves 26.1-26.4, the switching unit 20' in this case comprises only a single switching valve 26. This single switching valve 26 is preferably realized as an electrical switching valve. The principle of having two separate heating cycles, a pre-heating cycle and a brewing cycle between which the switching unit 20' may switch the flow paths, however remains the same. FIG. 2A shows the pre-heating cycle, whereas FIG. 2B illustrates the brewing cycle.

Such a single electrical switching valve may not only save costs, but also allows to switch the liquid flows in an even faster manner compared to the first embodiment. Instead of closing and opening the different mechanical valves, the electrical switching valve 26 just switches the internal paths. As illustrated in FIG. 2, the switching unit 20' will switch the flow path that leaves the switching unit 20' at the outlet O1 from the inlet I1 to the inlet I2 when changing from the pre-heating cycle to the brewing cycle. In the same way it will also switch the flow path that enters the switching unit at the inlet I3 from outlet O2 to outlet O3. The controller 28 that has been shown as a separate entity according to the first embodiment may in the second embodiment shown in FIG. 2 be directly integrated into the switching unit 20'.

Figure 3A:
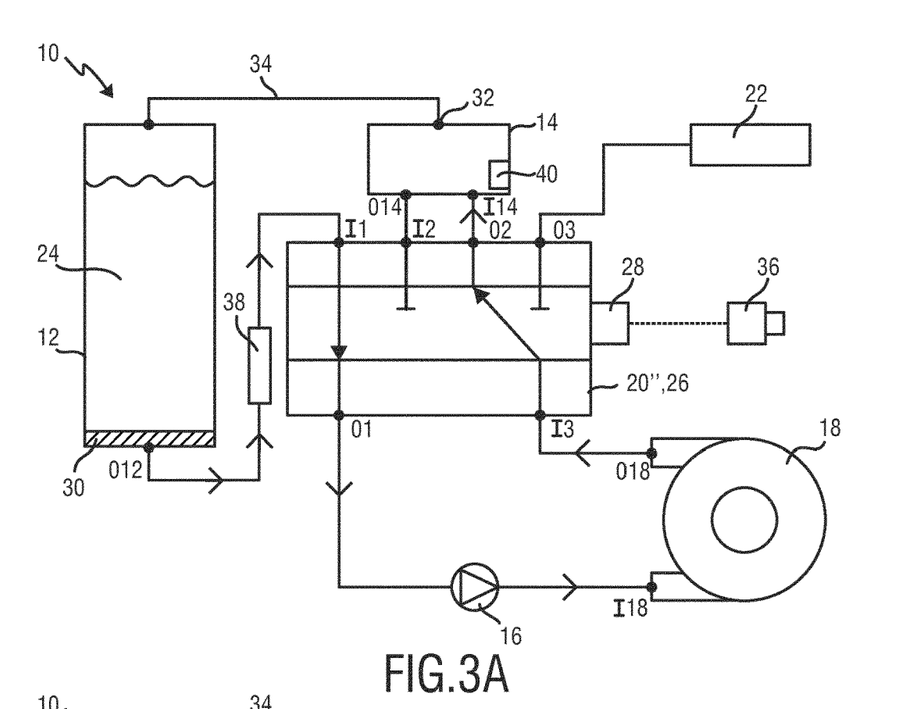
Figure 3B:
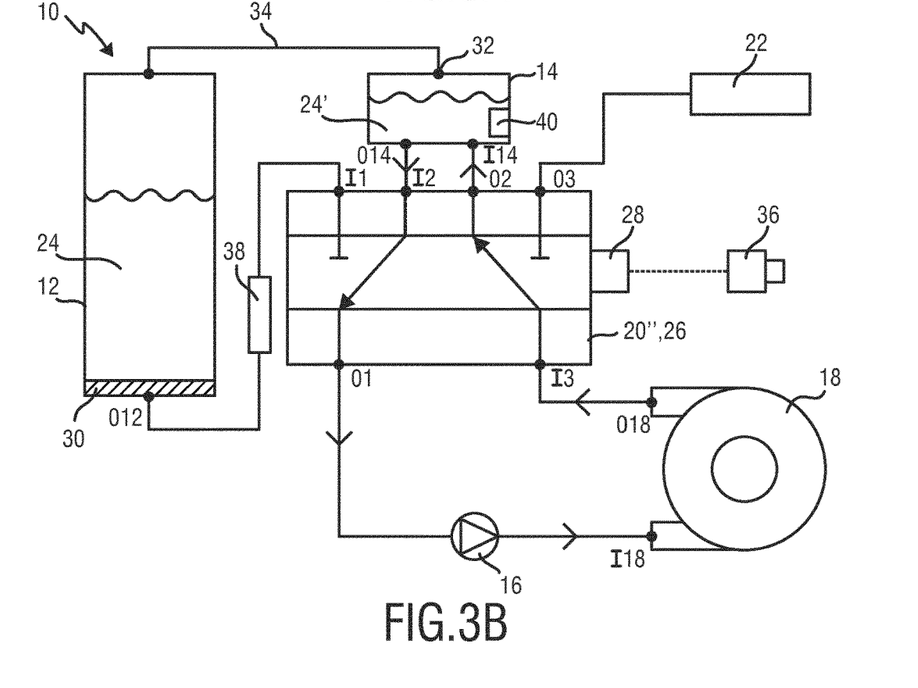
Figure 3C:
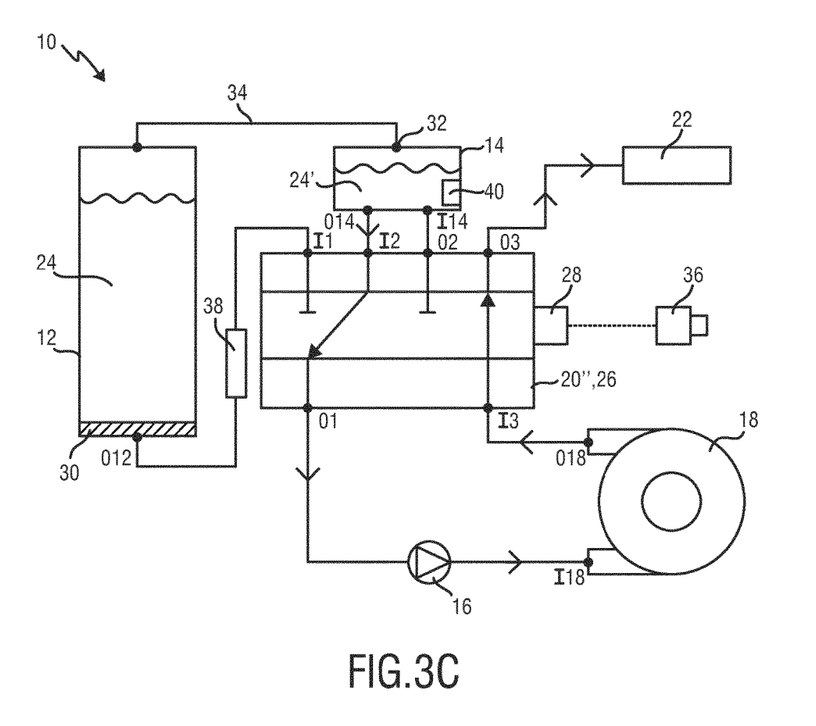

Further refinements of the liquid heating device 10 according to the present invention may be observed from the third embodiment shown in FIGS. 3A to 3C.

The liquid heating device 10 may further comprise a second heating element 30 for pre-heating the liquid 24 within the first tank 12. This second heating element 30 may be e.g. realized as a heating plate or an immersion heater. In this way the whole amount of liquid 24 within the first tank 12 will be pre-heated, for example to a temperature of 20-25° C. even before it is released from the first tank 12 and then pre-heated within the pre-heating cycle.

Furthermore, the second tank 14 may comprise an overflow outlet 32 that is fluidly connected with the first tank 12. This overflow outlet may e.g. be connected with the first tank 12 via an overflow pipe or tube 34. This may prevent an overflow within the second tank 14 that might occur if too much liquid 24 is pumped into the second tank 14 during the pre-heating cycle.

A further refinement may be achieved if the liquid heating device 10 furthermore comprises an data interface 36 that is connected to the controller 28 of the switching unit 20". This data interface 36 may be configured to receive the pre-defined amount of liquid 24 that is necessary for a hot beverage that has been selected by a user. If the user e.g. selects an espresso coffee by pressing an "espresso coffee"-button of the hot beverage machine, this data interface 36 may receive the information that for the recipe of an espresso coffee an amount of 40 ml heated liquid has to be supplied. The controller 28 may then control the switching unit 20" to open up the pre-heating cycle (see FIG. 3A) until 40 ml have been withdrawn from the first tank 12. As soon as this amount of liquid 24 has been pre-heated within the pre-heating cycle and transferred to the second tank 14, the controller 28 may then switch the switching unit 20" by switching the electrical valve 26 into its second position in order to open up the brewing cycle. This ensures that no unnecessary energy is consumed for pre-heating the liquid 24. In other words, only the amount of liquid 24 that is needed for the selected hot beverage will then be pre-heated in the pre-heating cycle and afterwards heated to the end temperature within the brewing cycle that is illustrated in FIG. 3C.

In this case the amount of liquid 24 that is withdrawn from the first tank 12 should be measured, such that the controller 28 receives the information when to switch the switching valve 26 of the switching unit 20". This may be done with a flow meter 38 and/or with a fluid level sensor 40 that is arranged within the second tank 14.

The flow meter 38 may measure the liquid flow rate that is released from the first tank 12. This liquid flow rate may be integrated over time which may be either done by the flow meter 38 itself or by transferring the measured flow rate to the controller 28, so that the controller then calculates the total amount of liquid 24 that has been released from the first tank 12. The flow meter 38 may be arranged between the first tank 12 and the switching unit 20", as shown in FIG. 3. Alternatively, it could be also arranged between the switching unit 20" and the pump 16 (not separately shown). However, in any case it is preferably arranged before the pump 16 in order to measure the flow rate in the low pressure regime of the system 10. Arranging it between the first tank 12 and the switching unit 20" even provides the advantage that the flow rate is measured in the cold-water regime.

On the other hand, the amount of pre-heated liquid 24' could also be measured with the fluid level sensor 40 that is arranged within the second tank 14. This fluid level sensor 40 may either be a mechanical sensor or an electronic sensor. Similar as the flow meter 38 it should also be connected to the controller 28 in order to being able to transfer the necessary information to the controller 28 when to switch the switching unit 20" into its second position (for the brew cycle). This connection may either be a hard-wired or a wireless connection.

It should be clear that not both the flow meter 38 and the flow level sensor 40 are necessary in order to measure the amount of liquid 24 that passes through the pre-heating cycle. However, using both the flow meter 38 and the fluid level sensor 40 has the advantage that leakages within the system could be detected, i.e. it could be detected how much liquid 24 is lost when the liquid 24 passes through the pre-heating cycle.

A still further refinement of the liquid heating device 10 may be observed from FIG. 3B. As shown in FIG. 3B the switching unit 20" may also be configured to switch the valve position of the switching valve 26 to a third valve position in which the pre-heated liquid 24' may flow from the second tank 14 through the flow-through heater 18 and back into the second tank 14. In this case the outlet O14 of the second tank 14 may connected to the inlet I2 of the switching unit 20" and the outlet O2 of the switching unit 20" may be connected to the inlet I14 of the second tank 14. This results in a closed loop of the fluid flow through the flow-through heater 18 from and to the second tank 14. This would allow to split-up the pre-heating process into several cycles, meaning that the fluid 24 would then pass the flow-through heater 18 more than one time in order to be pre-heated.

In practice, this could work as illustrated in FIGS. 3A to 3C. The switching unit 20" will first switch the switching valve 26 to its first position (see FIG. 3A) in order to pump liquid 24 out of the first tank 12, pre-heat it by means of the flow-through heater 18 and transfer it to the second tank 14 (first step of the pre-heating cycle). Then, the switching unit 20" will switch the switching valve 26 to its third position (see FIG. 3B), such that the pre-heated liquid 24' is pumped out of the second tank 14, pre-heated again in the flow-through heater 18 and transferred back to the second tank 14 (second pre-heating step). This may also be repeated for one or more times. Finally, the switching unit 20" will switch the valve position of the switching valve 26 into its second position (see FIG. 3C), such that the pre-heated liquid 24' is pumped out of the second tank 14 and heated to its desired end temperature by means of the flow-through heater 18, and may then be transferred to the liquid outlet 22 or into a brewing chamber of the hot beverage machine.

If the pre-heating cycle is split up into several cycles, the flow-through heater 18 may be operated at an even lower power level. This results from the fact that power of the flow-through heater 18 can be decreased, since each heating cycle will require less power.

Still further, it shall be noted that according to the three embodiments mentioned above (shown in FIGS. 1 to 3), it is also possible also possible to switch the switching unit 20, 20', 20" in such a way that the second tank 14 is bypassed. In this case the liquid 24 would directly flow from the first tank 12, through the flow-through heater 18, to the liquid outlet 22. In other words, the liquid 24 would not be pre-heated as explained above, but directly be heated-up to the desired end temperature. The switching unit 20, 20', 20" thereto only has to fluidly connect the inlet 118 of the flow-through heater 18 to the outlet O12 of the first tank, and the outlet O18 of the flow-through heater 18 to the liquid outlet 22. This configuration is beneficial for brewing recipes at low flow rate (like espresso), since the power in the flow-through heater 18 is then sufficient to heat-up liquid 24 at these low flow rates directly to the desired end temperature. This is less time consuming then heating the liquid 24 in two stages.

Figure 4A:
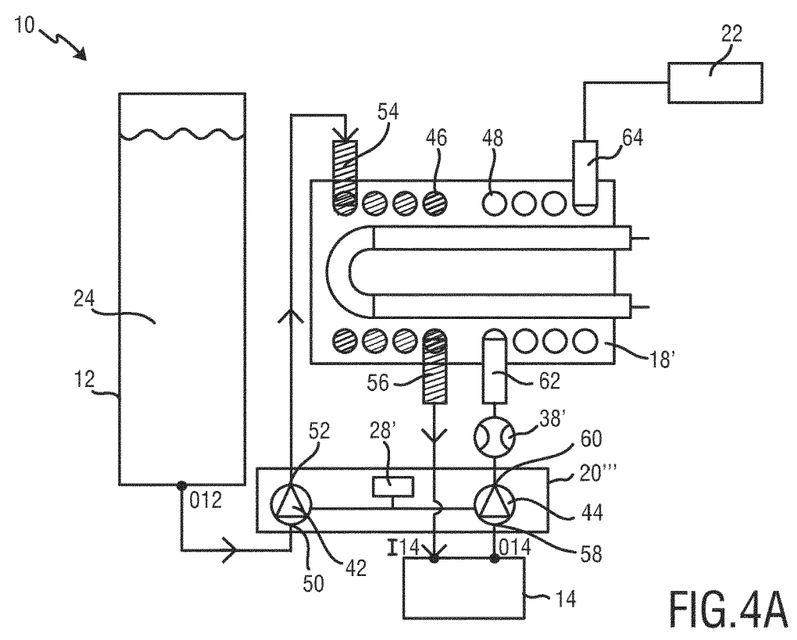
Figure 4B:
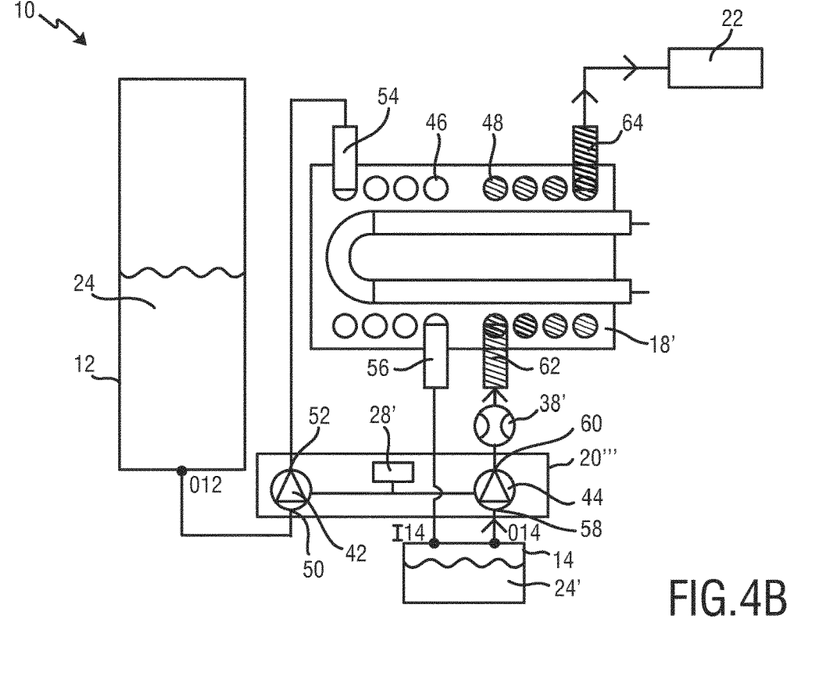

FIG. 4 shows a fourth embodiment of the liquid heating device 10 according to the present invention, wherein FIG. 4A again shows the pre-heating cycle and FIG. 4B shows the end-heating cycle. The technical principle of the present invention still remains the same. The liquid 24 is still heated up in two steps and temporarily stored within the second tank 14. The first step (pre-heating cycle) may be initiated either on demand of a user selecting a hot beverage or per default. The refinements mentioned above with respect to the first three embodiments may therefore still be combined with or included in the liquid heating device according to the fourth embodiment.

The difference of the liquid heating device 10 according to the fourth embodiment is, however, that the switching unit 20'" comprises two pumps 42, 44 instead of one or more valves. The first pump 42 is used for the pre-heating cycle and the second pump 44 is used for the end-heating cycle, as this will be explained further below. A further difference of the fourth embodiment is that the flow through heater 18' comprises two different parts or fluid channels 46, 48. In the pre-heating cycle the liquid 24 flows through the first part 46 of the flow through heater 18' and in the end-heating cycle the liquid 24 flows through the second part 48 of the flow through heater 18', as this will be also explained further below.

For switching the liquid heating device 10 between the pre-heating cycle and the end-heating cycle, the switching unit 20' preferably comprises a controller 28' again. This controller 28' may be realized as a separate entity or as an integrated entity (e.g. integrated in the two pumps 42, 44). The controller or control unit 28' is configured to selectively power on either the first pump 42 or the second pump 44.

In the pre-heating cycle (see FIG. 4A) the controller 28' will turn on the first pump 42. This first pump 42 is at its inlet-side 50 fluidly connected to the outlet O12 of the first tank 12, and at its outlet-side 52 fluidly connected to a first inlet 54 of the flow through heater 18'. In the pre-heating cycle the first pump 42 will therefore withdraw liquid 24 from the first tank 12 and push it via the first inlet 54 through the first part 46 of the flow through heater 18'. The liquid 24 will thereby flow from the first inlet 54 of the flow through heater 18' to a first outlet 56 of the flow through heater 18'. The pre-heated liquid 24' will then flow from the first outlet 56 of the flow through heater 18' to the second tank 14 in order to be temporarily stored therein. The first pump 42 may be a relatively cheap pump, since it will only have to operate at very low pressures (near ambient pressure).

In the end-heating cycle the second pump 44 will be turned on in order to withdraw the pre-heated liquid 24' from the second tank 14 and push it through the second part 48 of the flow through heater 18' in order to heat it up to the desired end temperature. The inlet-side 58 of the second pump 44 is fluidly connected to the second tank 14. The outlet-side 60 of the second pump 44 is fluidly connected to a second inlet 62 of the flow through heater 18'. The term "fluidly connected" shall herein generally mean that the parts are either directly or indirectly fluidly connected. In the case shown in FIG. 4 the outlet-side 60 of the second pump 44 is indirectly fluidly connected to the second inlet 62 of the flow through heater 18', since the liquid 24 will preferably pass a flow meter 38' in between. After passing the second part 48 of the flow through heater 18', the liquid 24, which is then heated up to the desired end temperature, will flow to the liquid outlet 22.

Similar as according to the first three embodiments shown in FIGS. 1 to 3, the controller 28' will control the two pumps 42, 44 preferably in such a way that the amount of liquid 24 that is pre-heated within the pre-heating cycle equals the amount of liquid 24 that is needed for the hot beverage that has been selected by the user. This may be done in the same way as explained with reference to FIGS. 3A and 3B by means of a data interface 36 (not explicitly shown in FIGS. 4A, 4B). The amount of liquid 24 that passes through the pre-heating cycle may be measured in several ways.

According to a first alternative, the amount of liquid 24 is measured by means of the flow meter 38'. According to a second alternative, the amount of liquid passing through the pre-heating cycle may be determined or defined by means of the pumps 42, 44. The generated flow rate of each pump 42, 44 may be pre-calibrated, such that the amount of liquid 24 may be calculated on the basis of the pre-calibrated flow rate generated by each pump 42, 44 and the time each pump 42, 44 is turned on. For an even more precise measurement a second flow meter (not explicitly shown) may be arranged between the first pump 42 and the first inlet 54 of the flow through heater 18'. Such a second flow meter would allow to separately measure the flow rates/amounts of liquid within both cycles, i.e. within the pre-heating cycle as well as within the end-heating cycle.

Lastly, it shall be noted that the flow through heater 18' is shown in FIG. 4 only in a schematic manner. The specific design of the flow through heater 18' may differ from the design shown in FIG. 4. The flow through heater 18' may also be designed as a fast response flow through heater. In order to accomplish the technical principle of the fourth embodiment of the present invention, it is only necessary that the flow through heater 18' comprises two separate fluid channels 46, 48, one for the pre-heating cycle and one for the end-heating cycle. These two different fluid channels 46, 48 may be differently insulated and/or may have different lengths.

It shall be noted that the additional refinements, such as the second heating element 30, the overflow outlet 32, the data interface 36, the flow meter 38 and/or the fluid level sensor 40 may not only be implemented in a liquid heating system 10 according to the third embodiment shown in FIG. 3. All these elements may either alone or together be implemented also in a liquid heating device 10 according to any of the first two embodiments shown in FIGS. 1 and 2 or according to the fourth embodiment shown in FIG. 4.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A liquid heating device for a machine dispensing a hot beverage, the liquid heating device comprising:
   a flow-through heater;
   a first tank configured to retain a liquid to be heated;
   a second tank configured to temporarily store a pre-heated liquid;
   a fluid level sensor configured to measure a fluid level within the second tank;
   a liquid outlet configured to release heated liquid; and
   a switching unit configured to:
      switch a liquid flow cycle of the liquid heating device between:
         a pre-heating cycle, wherein a predefined amount of said liquid flows from the first tank through the flow-through heater, to pre-heat said predefined amount of said liquid, and into the second tank to temporarily store said predefined amount of said pre-heated liquid therein, wherein said predefined amount of said liquid is based on the hot beverage selected; and
         an end-heating cycle, wherein said predefined amount of said pre-heated liquid flows from the second tank through the flow-through heater to the liquid outlet,
   wherein the switching unit comprises a controller configured to switch between the pre-heating cycle and the end-heating cycle when the fluid level within the second tank reaches the predefined amount of said liquid.

2. The liquid heating device according to claim 1, wherein the controller is further configured to switch between the pre-heating cycle and the end-heating cycle depending on the predefined amount of said liquid released from the first tank.

3. The liquid heating device according to claim 2, further comprising:
   a flow meter configured to:
      measure a flow rate of said liquid released from the first tank; and
      calculate a total amount of released liquid therefrom, wherein the controller is configured to switch between the pre-heating cycle and the end-heating cycle when the calculated total amount of released liquid reaches the predefined amount of said liquid.

4. The liquid heating device according to claim 1, further comprising:
   a data interface connected to the controller, the data interface configured to:
      receive the predefined amount of said liquid.

5. The liquid heating device according to claim 1, wherein the switching unit further comprises:
   one or more switching valves,
   wherein the controller is further configured to switch a valve position of the one or more switching valves between a first valve position and a second valve position to switch between the pre-heating cycle and the end-heating cycle.

6. The liquid heating device according to claim 5, wherein the one or more switching valves comprises an electrical switching valve which includes the controller.

7. The liquid heating device according to claim 5, wherein the controller is further configured to:
   switch the valve position of the one or more switching valves to a third valve position in which the pre-heated liquid may flow from the second tank through the flow-through heater and back into the second tank again.

8. The liquid heating device according to claim 1, wherein the switching unit further comprises:
   a first pump on its inlet-side fluidly connected to the first tank and on its outlet-side fluidly connected to the flow-through heater; and
   a second pump on its inlet-side fluidly connected to the second tank and on its outlet-side fluidly connected to the flow-through heater,
   wherein the controller is further configured to:
      selectively turn-on one of: the first pump and the second pump, in order to switch the liquid flow cycle between the pre-heating cycle and the end-heating cycle.

9. The liquid heating device according to claim 8, wherein the outlet-side of the first pump is fluidly connected to a first inlet of the flow-through heater, and wherein the outlet-side of the second pump is fluidly connected to a second inlet of the flow-through heater that is different from the first inlet.

10. The liquid heating device according to claim 1, wherein the second tank is smaller than the first tank.

11. The liquid heating device according to claim 1, wherein the second tank comprises:
   an overflow outlet fluidly connected to the first tank.

12. The liquid heating device according to claim 1, further comprising:
   a second heating element configured to pre-heat said liquid within the first tank.

13. A hot beverage machine comprising:
   a liquid heating device as claimed in claim 1.

14. The hot beverage machine according to claim 13, wherein the hot beverage machine is a coffee machine and comprises a brewing chamber that is adapted to receive a coffee product to be extracted, wherein the brewing chamber is fluidly connected to the liquid outlet of the liquid heating device.

* * * * *